(12) United States Patent
Smith, Sr. et al.

(10) Patent No.: US 6,837,287 B2
(45) Date of Patent: Jan. 4, 2005

(54) SELF-SEALING PNEUMATIC TIRE AND PREPARATION THEREOF

(75) Inventors: David Michael Smith, Sr., Wadsworth, OH (US); Bina Patel Botts, Stow, OH (US); John Richard White, Wadsworth, OH (US); Ronald James Dill, Copley, OH (US); John Kotanides, Jr., Canton, OH (US); Michael Brendan Rodgers, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 222 days.

(21) Appl. No.: 10/171,057

(22) Filed: Jun. 13, 2002

(65) Prior Publication Data

US 2003/0230376 A1 Dec. 18, 2003

(51) Int. Cl.$^7$ ............................ B29C 73/16; B60C 19/12
(52) U.S. Cl. ...................... 152/503; 156/115; 523/166
(58) Field of Search .................... 156/115, 123, 156/133; 152/502–507; 523/166

(56) References Cited

U.S. PATENT DOCUMENTS

| 3,860,539 | A | * | 1/1975 | Miyazato | ................... 523/166 |
|---|---|---|---|---|---|
| 4,057,090 | A | * | 11/1977 | Hoshikawa et al. | ........ 152/504 |
| 4,256,158 | A | * | 3/1981 | Chautard et al. | ........... 152/505 |
| 4,895,610 | A | * | 1/1990 | Egan | .......................... 156/115 |
| 5,071,913 | A | * | 12/1991 | Powers et al. | ................ 525/87 |

* cited by examiner

Primary Examiner—Geoffrey L. Knable
(74) Attorney, Agent, or Firm—Henry C. Young, Jr.

(57) ABSTRACT

This invention relates to a pneumatic tire with puncture sealing property and a method for preparing such tire. Such tire is prepared by building an uncured butyl rubber-based layer, which contains a peroxide and a dispersion therein of a particulate precured rubber selected from pre resin-cured butyl rubber and/or pre sulfur-cured diene-based elastomer, into an uncured tire and between an innerliner layer and the tire carcass. Upon curing the prepared tire under conditions of elevated temperature, a major portion of the uncured butyl rubber composition is depolymerized to form a tacky material, which contains said dispersion therein of said particulate precured rubber, which has puncture sealant properties. Such layer of depolymerized butyl rubber and dispersed precured rubber particles may be collectively referred to as the sealant layer.

14 Claims, No Drawings

_US 6,837,287 B2_

SELF-SEALING PNEUMATIC TIRE AND PREPARATION THEREOF

FIELD OF THE INVENTION

This invention relates to a pneumatic tire with puncture sealing property and a method for preparing such tire. Such tire is prepared by building an uncured butyl rubber-based layer, which contains a peroxide and a dispersion therein of a particulate precured rubber selected from pre resin-cured butyl rubber and/or pre sulfur-cured diene-based elastomer, into an uncured tire and between an innerliner layer and the tire carcass. Upon curing the prepared tire under conditions of elevated temperature, a major portion of the uncured butyl rubber composition is depolymerized to form a tacky material, which contains said dispersion therein of said particulate precured rubber, which has puncture sealant properties. Such layer of depolymerized butyl rubber and dispersed precured rubber particles may be collectively referred to as the sealant layer.

BACKGROUND OF THE INVENTION

A pneumatic tire which contains a built-in sealant layer prepared by building a layer of butyl rubber-based composition, which contains a polyisobutylene polymer, following which under the conditions of elevated temperature and pressure used to cure the tire, a major portion of the butyl rubber is presented as being both crosslinked and depolymerized to form a tacky material which has puncture sealant properties in U.S. Pat. No. 4,895,610.

U.S. Pat. Nos. 4,228,839, 4,171,237 and 4,140,167 also relate to a sealant layer in a tire formed by depolymerizing and crosslinking a butyl rubber based rubber composition, particularly by irradiation treatment Historically, other patents relate to tire constructions, sealant compositions and methods wherein a sealant material is encased or encapsulated in between calendered layers. For example, see U.S. Pat. No. 3,048,509 and said U.S. Pat. No. 4,228,839.

Other methods, sealants and tire constructions have been suggested for puncture sealant pneumatic tires which relate to use of fluid puncture coatings in which the puncture sealant flows into the puncture hole. However, it is considered herein that such liquid puncture sealants may flow excessively under heated conditions and thereby may tend to cause the tire to become out of balance. Also, it is considered herein that many times such a liquid sealant coating would not likely be entirely operable or effective over a wide temperature range extending from summer to winter conditions More complicated structures where a liquid sealant material is encased in a vulcanized material are usually expensive to manufacture and can also create balance and suspension problems due to the additional weight required in the tire. Puncture sealing tires have been built wherein a layer of degraded rubber which is tacky or gummy (of low viscosity) is assembled into the unvulcanized tire. This method of construction is usually only reasonably possible when, for example, the degraded layer of rubber is laminated with another non-degraded layer which permits its handling during the tire building procedure. This is because the tacky, sticky nature and lack of strength in degraded rubber make it very difficult to handle alone without additional support and a barrier to keep it from sticking to a tire building machine or curing apparatus. By laminating the degraded rubber layer between two or more non-degraded rubber layers it is capable of retaining its structural integrity during the vulcanization operation wherein high pressures are applied to the tire which would displace the degraded rubber layer from its desired location if not laminated. Such a lamination procedure adds greatly to the cost of building a tire. Thus, such a lamination procedure has not been widely accepted on a commercial basis for building puncture sealing pneumatic tires. There has been a continuing desire for a pneumatic tire having an effective puncture sealing feature and for a simple and practical method of preparing such a tire.

This invention provides a method for building a tire with puncture sealing features by degrading (depolymerizing) a built-in rubber layer (butyl rubber based rubber composition), which is required to contain a dispersion therein of particles of a precured rubber selected from resin-cured butyl rubber and/or sulfur-cured diene-based rubber, after it is built into the tire and during the vulcanization of the tire. Therefore, during the tire building procedure the butyl rubber-based layer (which will be the sealant layer after the tire is cured) can be built into the tire in a manner similar to other rubber layers.

In the description of this invention, the term "phr" is used to designate parts by weight of an ingredient per 100 parts of elastomer unless otherwise indicated. The terms "elastomer" and "rubber" are used interchangeably unless otherwise indicated. The terms "cure" and "vulcanize" are used interchangeably unless otherwise indicated.

SUMMARY AND PRACTICE OF THE INVENTION

The method of this invention provides a simplified, relatively inexpensive process for manufacturing self-sealing pneumatic rubber tires with puncture sealant properties. In the tire building method of this invention a layer of butyl rubber-based rubber composition is assembled into an unvulcanized tire, wherein said butyl rubber composition contains a dispersion therein of precured rubber particles as resin-cured butyl rubber and/or sulfur-cured diene-based rubber, and also containing at least one peroxide that will depolymerize the butyl rubber at the temperatures used to cure the tire. In effect, the butyl rubber in the rubber composition is degraded (depolymerized) to a low viscosity to form a tacky material which has puncture sealing properties. In the method of this invention, the butyl rubber based rubber composition is assembled into the unvulcanized rubber tire and the tire is vulcanized using standard known methods which depolymerize and convert the butyl rubber based rubber composition into a sealant layer. In effect, it is considered that the peroxide depolymerizes the saturated backbone of the butyl rubber.

It is a significant aspect of this invention that the uncured butyl rubber composition to be used for the sealant layer also contains a dispersion therein of particles of precured rubber selected from resin-cured butyl rubber and/or sulfur cured diene-based rubber. Resin curing of butyl rubber is well known to those having skill in such art. The term "resin-cured" is used herein to relate to a butyl rubber which is cured with a combination of phenol formaldehyde resin and zinc oxide as a resin cure activator. By the term "resin cured" or "pre resin-cured", insofar as the resin cured butyl rubber particles are concerned, it is meant that such butyl rubber is resin-cured prior to mixing with the butyl rubber in the preparation of the rubber composition which is to become the sealant layer. By the term "sulfur cured" or "pre sulfur-cured", insofar as the sulfur-cured diene-based rubber particles are concerned, it is meant that such diene-based rubber (e.g. cis 1,4-polyisoprene natural rubber and/or other diene based elastomer or elastomers), is sulfur-cured prior to mixing with the butyl rubber in the preparation of the rubber composition which is to become the sealant layer.

It is considered herein that the dispersed pre resin-cured butyl particles contained in the said puncture sealant layer do not significantly undergo depolymerization by the peroxide contained in the butyl rubber composition because the cured structure associated with a resin cured butyl rubber is considered herein to protect the pre resin-cured butyl rubber from depolymerizing by limiting the exposure of the pre resin-cured butyl particles to the outside surface thereof by the peroxide curative, therefore keeping the pre resin-cured butyl particles intact without undergoing a depolymerization to any significant extent. It is considered herein that the pre sulfur-cured diene-based rubber particles do not undergo any appreciable depolymerization in the presence of the peroxide contained in the butyl rubber of the sealant rubber layer.

In accordance with this invention, a method of manufacturing a pneumatic rubber tire having an outer circumferential tread, a supporting carcass therefore, and an inner liner disposed inwardly from said supporting carcass, containing a puncture sealant layer positioned between said inner liner and said carcass, the steps of which comprise, based upon parts by weight per 100 parts by weight uncured butyl rubber (phr):

(A) providing a butyl rubber-based rubber composition comprised of.
   (1) 100 phr of uncured butyl rubber,
   (2) about 1 to about 35 phr of a particulate precured rubber, selected from resin-cured butyl rubber and/or sulfur-cured diene-based rubber, homogeneously dispersed in said uncured butyl rubber, and
   (3) about 1 to about 16 phr of organoperoxide;
(B) assembling said butyl rubber based rubber composition as a layer into an unvulcanized rubber tire between said carcass and said innerliner (e.g. bromobutyl rubber based inner liner) during the tire building process; and
(C) shaping and curing said rubber tire at a temperature in a range of about 130° C. to about 170° C. for a sufficient period time to partially depolymerize said uncured butyl rubber in said butyl rubber-based rubber composition layer, wherein said particulate precured rubber substantially remains in its precured condition as a particulate dispersion within said partially depolymerized butyl rubber.

In further accordance with this invention, a pneumatic tire is provided which comprises an outer circumferential tread, a supporting carcass therefore and an inner rubber liner disposed inwardly from said supporting carcass, and a puncture sealant layer which is disposed between said carcass and said innerliner wherein said puncture sealant layer comprises a partially depolymerized butyl rubber layer which contains a dispersion of said particulate precured rubber.

In the method of this invention, an uncured butyl rubber based rubber composition layer, which contains a dispersion of said particulate precured rubber, is assembled into an unvulcanized rubber tire using conventional tire building techniques. After an unvulcanized tire is built including such a butyl rubber composition layer the tire is vulcanized in a suitable mold employing standard methods, namely the aforesaid elevated temperature. Such a butyl rubber composition layer (sealant layer precursor) is assembled into an unvulcanized rubber tire between the tire's supporting carcass (usually a diene-based, fabric or steel reinforced, sulfur curable rubber composition) and rubber innerliner layer, or air barrier layer, which is usually a sulfur curable, non-fabric reinforced, rubber composition which contains a halobutyl rubber such as for example chlorobutyl rubber or bromobutyl rubber. Such innerliner may alternatively be comprised, for example, of one or more sulfur curable diene-based elastomers such as, for example, cis 1,4-polyisoprene natural rubber, cis 1,4-polybutadiene rubber and styrene/butadiene rubber, and their mixtures, or more preferably a combination of one or more of said halobutyl rubbers and said diene based elastomers. The butyl rubber composition based sealant layer can be therefore sandwiched between the tire carcass and a rubber innerliner layer.

In such manner, the butyl rubber of the sealant layer is depolymerized within the tire with, or by, an organoperoxide during the curing of the tire itself.

The physical nature of the butyl rubber composition layer (for the sealant layer) is that, as a butyl rubber based rubber composition, its viscosity is sufficient to permit easy handling and processing during the standard steps in the construction of an unvulcanized tire and during the vulcanization (curing) operation that is, the polymer composition layer has enough uncured strength (modulus) and sufficient viscosity to retain its shape during building and enough building tack to stick to adjacent layers during building and enough strength to substantially retain its shape during the application of the high pressure and elevated temperature in a suitable mold during vulcanization.

As the tire is vulcanized together with the butyl rubber based rubber composition layer (the sealant layer precursor) sandwiched between the tire carcass ply(s) and the tire's rubber innerliner, the butyl rubber of the butyl rubber based composition layer which is to become the sealant layer, becomes partially depolymerized (degraded). In effect, the butyl rubber in the butyl rubber based composition sealant layer is degraded to a low viscosity to form a tacky material which has puncture sealing properties. Thus, the butyl rubber composition layer is transformed into a puncture sealant layer during the curing of the tire. This partial depolymerization of the butyl rubber composition layer is effectuated by the presence of one or more organoperoxides contained in the butyl rubber composition which causes the butyl rubber depolymerization by breaking the molecular chains, due to the highly unsaturated structure of the butyl rubber.

Butyl rubber for the sealant layer for this application may be prepared, for example, by copolymerizing isobutylene with small amounts of isoprene. Generally, butyl rubber contains from about one to about six percent repeat units derived from isoprene and from about 94 to 99 percent repeat units derived from isobutylene by weight. The butyl rubber that can be employed in the polymer composition of the tires of this invention typically has a number average molecular weight, for example, in the range of 200,000 to 500,000 and alternately in the range of about 300,000 to about 400,000. Such butyl rubber and its preparation is well known to those having skill in such art.

It is preferable for the butyl rubber based rubber composition layer assembled into the tires of this invention is comprised of: about 100 phr of a butyl rubber as a copolymer of isobutylene and minor amount of isoprene (e.g. the aforesaid from one to 6 percent); about 10 to 50 phr of carbon black, about 1 to about 35 phr of particles of said precured rubber, about 5 to 35 phr of rubber processing oil (as an oil extender); from zero to 1 phr of sulfur, (preferably free of sulfur), and a sufficient amount of organoperoxide to cause the butyl rubber to depolymerize, usually from about 1 to 16 phr of the organoperoxide depending somewhat upon the time and temperature of the tire curing operation and the degree of depolymerization desired In one aspect of the invention, the uncured butyl rubber may be a star branched butyl rubber as a polymer of isobutylene and a minor amount of isoprene (e.g. from 1 to 6 weight percent units derived from isoprene) and a branching agent. Inclusion of the branching agent permits branching of the polymer in a form of a star branched configuration. The term "star branched" is a configuration well known to those having skill in such art.

Representative star branched butyl rubbers are, for example, SB Butyl 4266 rubber and SB Bromobutyl 6222 rubber from the ExxonMobil Corporation.

It is to be understood that other elastomers in an amount of from zero to about 15 phr, alternatively about 5 to about 15 phr, can be used in combination with the butyl rubber in the sealant layer composition to enhance processing characteristics in the uncured and in the partially depolymerized states. Representative examples of such elastomers are, for example, cis 1,4-polyisoprene, styrene/butadiene copolymers, styrene/isoprene/butadiene terpolymers, halogenated butyl rubber such as bromobutyl rubber and/or chlorobutyl rubber, and polychloroprene (neoprene) rubber as well as other suitable elastomers as diene-based elastomers based upon isoprene and/or 1,3-butadiene.

It is to be understood that other known fillers and/or reinforcing agents, such as silica particularly precipitated silica, kaolin clay, calcium carbonate and carbon black having silica domains on its surface can be used in combination with or substituted for part of the carbon black in this composition It is believed to be understood by those having skill in the art of rubber compounding that the rubber processing oil might be used, if desired, and one or more resins such as, for example, an unreactive phenol-formaldehyde resin, a petroleum hydrocarbon resin, an alkyphenol-acetylene resin or a mixture of alkylated napthenic and aromatic hydrocarbon resin to aid in the processing characteristics or various physical properties of the butyl rubber composition.

Various organoperoxides may be used in the polymer (sealant) composition layer. Preferably organoperoxides are desired which only disintegrate at high temperatures, that is, above about 100° C. Examples of such organoperoxides are, for example, tertbutyl perbenzoate and dialkyl peroxides with the same or different radicals, such as dialkylbenzene peroxides and alkyl pre-esters. Preferably the organoperoxide will contain two peroxide groups. Frequently the peroxide groups are attached to a tertiary butyl group. The basic moiety on which the two peroxide groups are suspended can be aliphatic, cycloaliphatic, or aromatic radicals. Some representative examples of such organoperoxides are, for example, 2,5-bis(t-butyl peroxy)-2,5-dimethyl hexane; 1,1-di-t-butyl peroxi-3,3,5-trimethyl cyclohexane, 2,5-dimethyl-2,5-di(t-butyl peroxy) hexyne-3; p-chlorobenzyl peroxide, 2,4-dichlorobenzyl peroxide; 2,2-bis-(t-butyl peroxi)-butane; di-t-butyl peroxide; benzyl peroxide; 2,5-bis(t-butyl peroxy)-2,5-dimethyl hexane, dicumyl peroxide; and 2,5-dimethyl-2,5-di(t-butyl peroxy) hexane. Such organoperoxides may be added to the polymer composition layer in pure form (100 percent active peroxide) or on an inert, free-flowing mineral carrier, such as, for example, calcium carbonate. Such carrier composition containing from about 35 to 60 weight percent active ingredient (peroxide) can be employed very successfully. For example, 40 percent by weight dicumylperoxide on an inert carrier may be employed in the butyl rubber composition sealant layer Usually, dicumylperoxide is a preferred organoperoxide.

Known stabilizing agents that are used in rubber compounds might be utilized, if desired, in the butyl rubber composition layer of this invention. The amount of the stabilizing agent in the rubber composition might vary, for example, from 0 to as much as 10 parts by weight (phr) based upon a stabilization, if desired, for the butyl rubber composition.

The various components of the sealant layer can be mixed together using any convenient rubber mixing equipment, particularly an internal rubber mixer. The rubber composition used in the sealant layer typically has sufficient viscosity and unvulcanized adhesion to enable its incorporation into an unvulcanized tire without departing from standard, long standing tire building techniques and without the use of complicated, expensive tire building equipment.

In the method of this invention, the butyl rubber based rubber composition can be formed into a strip of unvulcanized rubber, by using conventional equipment such as a calender, extruder, or any combination thereof, that is assembled into the tire. In building the tires of this invention a butyl rubber based (e.g. bromobutyl rubber) rubber innerliner is first applied to a building drum and then the strip of butyl polymer composition (the sealant layer) is applied to the layer of innerliner. After this strip of butyl rubber based rubber composition (eventual sealant layer) is assembled into the unvulcanized tire other normal tire components are assembled into the tire using standard tire building methods. It is generally preferred for this butyl rubber based rubber composition layer (which is to be the sealant layer) to be assembled into the unvulcanized tire between an innerliner layer and tire carcass.

The strip of unvulcanized butyl rubber composition employed as in the sealant composition layer should extend from one shoulder of the tire to the other, in other words, it should cover the crown area or region of the tire. The thickness of the sealant composition layer can vary greatly in an unvulcanized puncture sealant containing tire. Generally, the thickness of the sealant composition layer may range from about 0.13 cm (0.05 inches) to about 1.9 cm (0.75 inches). In passenger tires it is normally desired for the sealant composition layer to have a thickness of about 0.32 cm (0.125 inches) whereas for truck tires, a thickness of about 0.76 cm (0.3 inches) or greater might be desired.

After the unvulcanized pneumatic rubber tires of this invention are assembled they are vulcanized using a normal tire cure cycle The tires of this invention can be cured over a wide temperature range. For example, passenger tires might be cured at a temperature ranging from about 132° C. (270° F.) to about 166° C. (330° F.) and truck tires might be cured at a temperature ranging from about 150° C. to about 180° C. Thus, a cure temperature may range, for example, from about 130° C. to about 180° C. and for a period of time (e.g. from about 7 to about 35 minutes or more depending somewhat upon the size of the tire and the degree of desired depolymerization of the butyl rubber) and sufficient to at least partially depolymerize said sealant precursor layer depending also upon the aforesaid choice of curing temperature. In practice, a period of time used to vulcanize the tires, in a suitable mold, may therefore, for example, have a duration of about 10 to 14 minutes for a passenger tire and for about 25 to about 35 minutes for a truck tire.

Accordingly, in one aspect of the invention, a self-sealing pneumatic rubber tire of this invention is envisioned wherein the tire has sidewalls, a supporting carcass, inextensible beads, an innerliner (air barrier layer), a sealant layer, and an outer circumferential tread (tread portion). The individual sidewalls extend radially inward from the axial outer edges of the tread portion to join the respective inextensible beads. The supporting carcass acts as a supporting structure for the tread portion and sidewalls. The sealant layer is disposed between said supporting carcass and said innerliner. The outer circumferential tread is adapted to be ground contacting when the tire is in use.

The following examples are included to further illustrate the method of manufacturing the self-sealing pneumatic rubber tires of this invention. These examples are intended to be representative of the present invention and are not to be regarded as limiting the scope of the invention or the manner in which it can be practiced. Unless specifically indicated otherwise, parts and percentages are given by weight.

EXAMPLE I

A tubeless pneumatic steel belted rubber tire of the type 295/75 R 22.5 is prepared by first applying a standard butyl rubber innerliner layer (e.g. bromobutyl rubber composition) to a standard building drum. Then a layer of butyl rubber composition having a thickness of about 0.3 inches (0.76 cm.) is applied to the innerliner layer on the building drum as butyl rubber based rubber layer which is the pre-cursor to the becoming the sealant layer The butyl rubber (sealant precursor) layer is composed of the following components, based on parts by weight per 100 parts of the butyl rubber, or phr: 100 parts of a star branched butyl rubber which is a copolymer of isobutylene and about 1 to about 6 percent units derived from isoprene, 29 parts of carbon black, 22 parts of rubber processing oil, and 3.2 parts of 40 percent dicumylperoxide on an inert precipitated calcium carbonate carrier and 5 parts of a pre resin-cured butyl rubber particles (pre cured with a phenol formaldehyde resin with a zinc oxide cure promoter). The innerliner layer was a bromobutyl rubber based rubber composition.

The tread portion, side-walls, beads, and supporting carcass are then assembled into the tire using conventional techniques utilized in the manufacture of steel belted radial tires. This self-sealing tire is cured employing a standard technique in a suitable mold at an elevated temperature of about 150° C. for about 30 minutes.

While certain representative embodiments and details have been shown for the purpose of illustrating the invention, it will be apparent to those skilled in this art that various changes and modifications may be made therein without departing from the spirit or scope of the invention.

What is claimed is:

1. A method of manufacturing a pneumatic rubber tire having an outer circumferential tread, a supporting carcass therefore, and an inner liner disposed inwardly from said supporting carcass, containing a puncture sealant layer positioned between said inner liner and said carcass, the steps of which comprise, based upon parts by weight per 100 parts by weight uncured butyl rubber (phr):

(A) providing a butyl rubber-based rubber composition comprised of:
        (1) 100 phr of uncured star branched butyl rubber,
        (2) about 1 to about 35 phr of a particulate precured rubber, selected from resin-cured butyl rubber and/or sulfur-cured diene-based rubber, homogeneously dispersed in said uncured butyl rubber, and
        (3) about 1 to about 16 phr of organoperoxide;

(B) assembling said butyl rubber based rubber composition as a layer into an unvulcanized rubber tire between said carcass and said innerliner during the tire building process; and (C) shaping and curing said rubber tire at a temperature in a range of about 130° C. to about 170° C. for a sufficient period time to partially depolymerize said uncured butyl rubber in said butyl rubber-based rubber composition layer, wherein said particulate precured rubber substantially remains in its precured condition as a particulate dispersion within said partially depolymerized butyl rubber.

2. The method of claim 1 wherein said precured rubber is a resin-cured butyl rubber cured with a phenol formaldehyde curative and zinc oxide resin cure promoter.

3. The method of claim 1 wherein said precured rubber is a sulfur-cured diene-based rubber.

4. The method of claim 1 wherein said organoperoxide is selected from at least one of tertbutyl perbenzoate, dialkylbenzene peroxides, 2,5-bis(t-butyl peroxy)-2,5-dimethyl hexane; 1,1-di-t-butyl peroxi-3,3,5-trimethyl cyclohexane; 2,5-dimethyl-2,5-di(t-butyl peroxy) hexyne-3; p-chlorobenzyl peroxide; 2,4-dichlorobenzyl peroxide; 2,2-bis-(t-butyl peroxi)-butane; di-t-butyl peroxide; benzyl peroxide; 2,5-bis(t-butyl peroxy)-2,5-dimethyl hexane, dicumyl peroxide; and 2,5-dimethyl-2,5-di(t-butyl peroxy) hexane.

5. The method of claim 1 wherein said organoperoxide is comprised of dicumylperoxide.

6. A tire prepared by the method of claim 1.

7. A pneumatic tire comprising an outer circumferential tread, a supporting carcass therefore and an inner rubber liner disposed inwardly from said supporting carcass, and a puncture sealant layer which is disposed between said carcass and said innerliner, wherein said puncture sealant layer comprises a partially depolymerized star branched butyl rubber layer which contains a dispersion of particulate precured resin-cured butyl rubber and/or sulfur-cured diene-based rubber.

8. The tire of claim 7 wherein said particulate precured rubber is a resin-cured butyl rubber.

9. The tire of claim 7 wherein said particulate precured rubber is a sulfur-cured diene-based rubber.

10. The tire of claim 7 wherein said star branched butyl rubber of said sealant layer is depolymerized within the tire with an organoperoxide during the curing of the tire.

11. The tire of claim 10 wherein said organoperoxide is selected from at least one of tertbutyl perbenzoate, dialkylbenzene peroxides, 2,5-bis(t-butyl peroxy)-2,5-dimethyl hexane; 1,1-di-t-butyl peroxi-3,3,5-trimethyl cyclohexane; 2,5-dimethyl-2,5-di(t-butyl peroxy) hexyne-3; p-chlorobenzyl peroxide; 2,4-dichlorobenzyl peroxide; 2,2-bis-(t-butyl peroxi)-butane; di-t-butyl peroxide; benzyl peroxide; 2,5-bis(t-butyl peroxy)-2,5-dimethyl hexane, dicumyl peroxide; and 2,5-dimethyl-2,5-di(t-butyl peroxy) hexane.

12. The tire of claim 10 wherein said organoperoxide is comprised of dicumyl peroxide.

13. The tire of claim 11 wherein said particulate precured rubber is a resin-cured butyl rubber.

14. The tire of claim 11 wherein said particulate precured rubber is a sulfur-cured diene-based rubber.

* * * * *